United States Patent Office 3,560,160
Patented Feb. 2, 1971

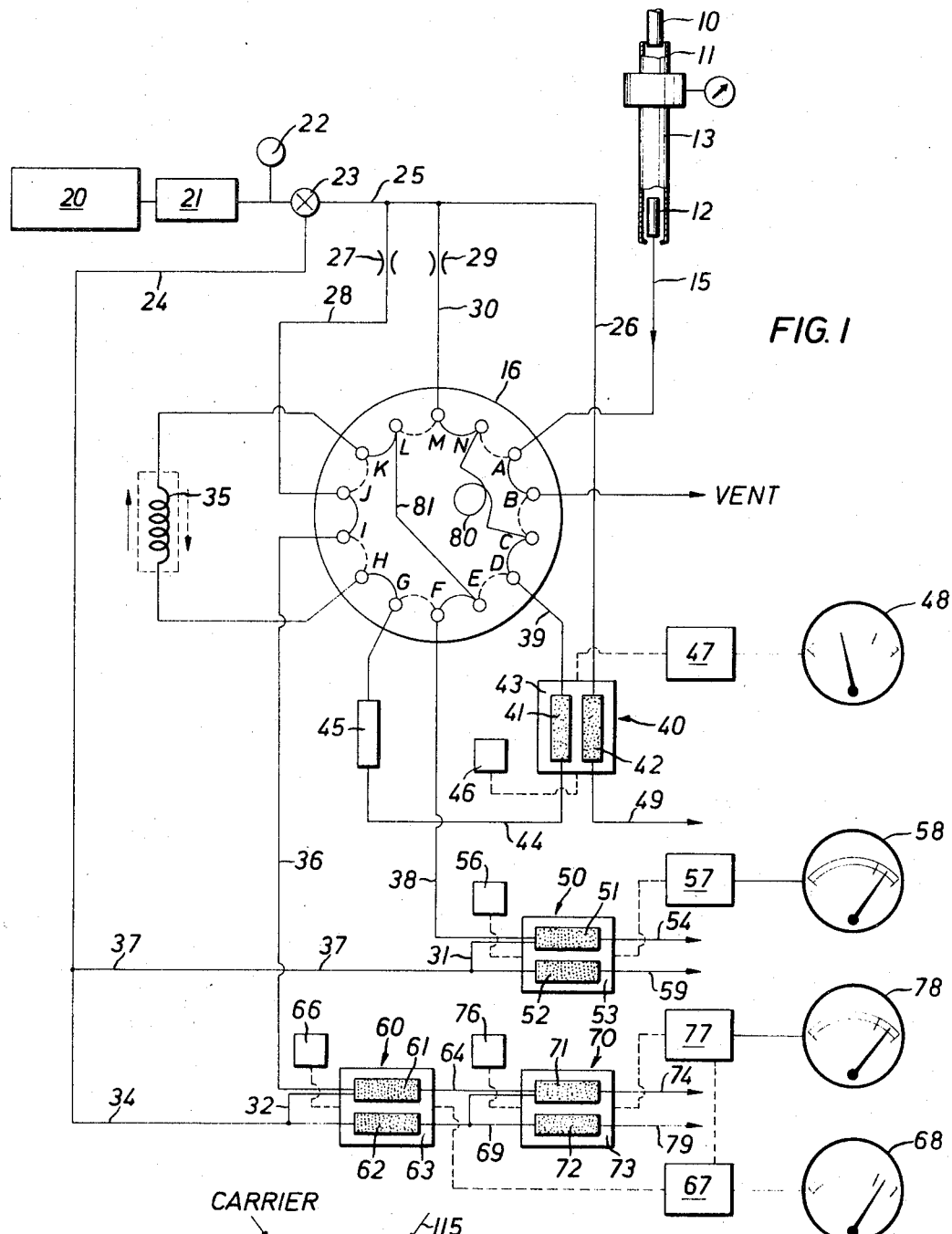

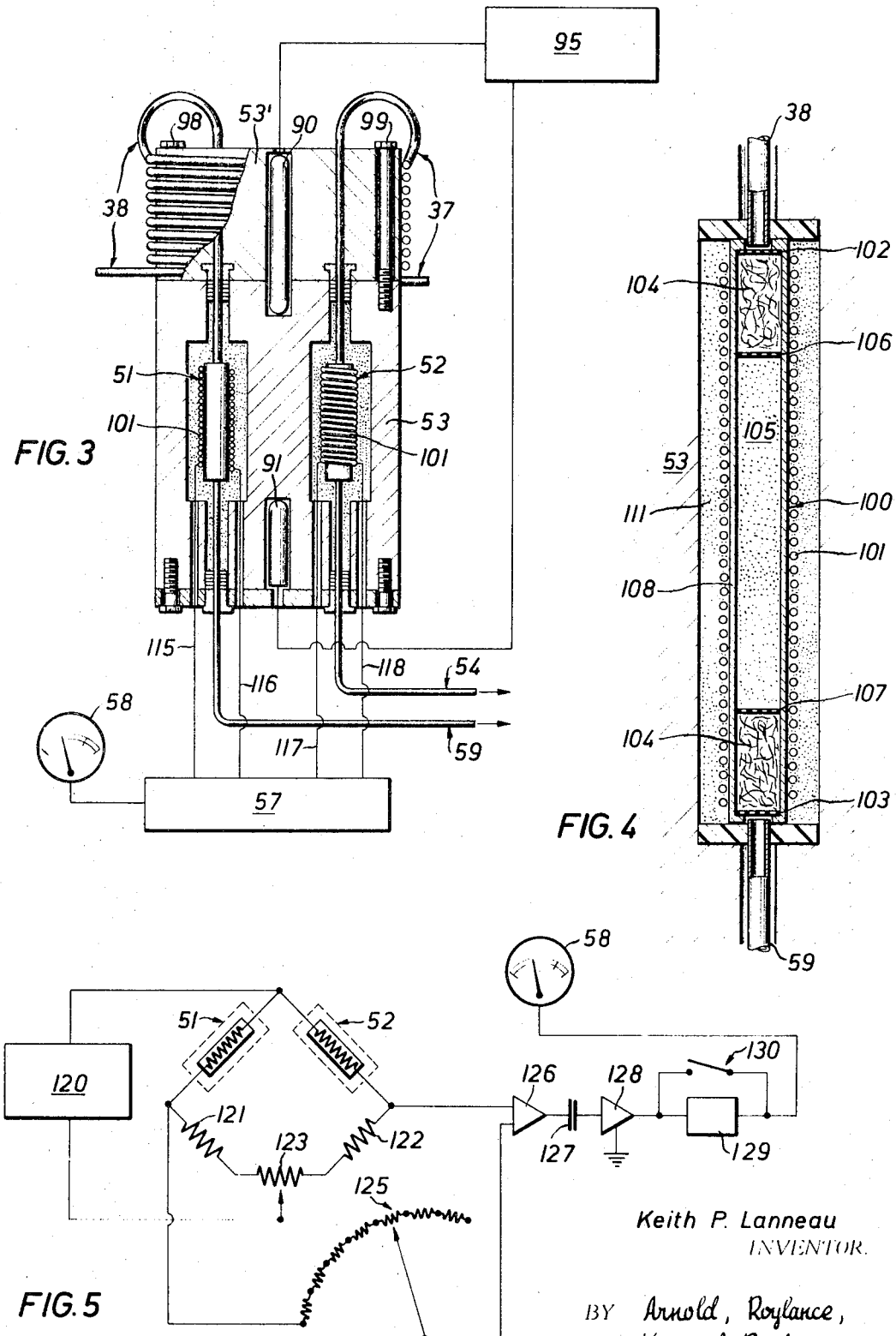

3,560,160
PULSE CALORIMETRIC DETECTOR
Keith P. Lanneau, Baton Rouge, La., assignor, by mesne assignments, to Tracor, Inc., Austin, Tex., a corporation of Texas
Filed July 11, 1968, Ser. No. 744,145
Int. Cl. G01n *31/08, 31/10*
U.S. Cl. 23—232     34 Claims

ABSTRACT OF THE DISCLOSURE

An analytical method and compact portable device useful for making quantitative measurements of the amounts of hydrocrabons and carbon monoxide in a gas sample, such as an automobile exhaust, effects the analysis by catalytic combustion of the sample. A selected volume of sample to be analyzed is pulsed into a chromatographic column wherein the hydrocarbon components are separated from the carbon monoxide, carbon dioxide, hydrogen and other components. The amounts of hydrocarbon and carbon monoxide are then separately determined by measuring the heat generated by each of these components as they are passed over a suitable combustion catalyst at specific temperatures to effect complete combustion. Analysis of carbon dioxide can be simultaneously accomplished by providing a third detector device for carbon dioxide determination.

BACKGROUND OF THE INVENTION

The instant invention relates to a method and apparatus for analysis of gases and the like. More particularly, the instant invention provides a novel technique and a compact analytical instrument which can be employed to analyze the combustion products produced by burning carbon fuels and the like. In a particular aspect, the instant invention provides a novel instrument for analysis of the exhaust of an internal combustion engine to indicate the amount of noxious and polluting components issuing from the exhaust.

The last twenty years have seen a widespread recognition of the seriousness of the air pollution problem in metropolitan areas of the United States. Within the last several years, there has been a rapid escalation of efforts at all governmental levels to identify and control the sources of atmospheric pollution.

By far, the prime offender in the area of atmospheric pollution is automotive exhaust. The total amount of pollutants from atuomotive exhaust is almost twice that of the combined pollutants from all other sources, e.g., manufacturing, electric power generation, space heating, and burning of refuse. The pollutants present in greatest amounts in automotive emissions are carbon dioxide, carbon monoxide, hydrocarbons, and oxide of nitrogen.

Under recent enabling legislation, standards have been set calling for reductations, specifically in hydrocarbon and carbon monoxide emissions from automotive exhausts. Accordingly, automobiles have been equipped with control devices which are intended to reduce the amount of carbon monoxide and hydrocarbon emission. However, as automotive pollutant emission standards become fixed, it will be necessary to provide facilities where automobiles may be inspected and where the exhaust emissions may be analyzed to determine if an automobile is exceeding maximum permissible pollution levels.

In this regard, in the future, it may be desirable not only to determine hydrocarbon and carbon monoxide concentrations, but also to determine concentration of other pollutants. Carbon dioxide which is the single largest volume component of automobile exhausts should be also desirably monitored. The amount of those specific compounds which contribute to the formation of smog in an automotive emission stream would also be a significant measurement. Certain of the unsaturated or olefinic hydrocarbons enter into photochemical reactions when exposed to ultraviolet light in the atmosphere resulting in the production of the atmospheric phenomenon commonly called smog. Accordingly, the presence of these hydrocarbons in relation to overall hydrocarbon content may also be desirably determined by an automobile exhaust inspection device, since smog control is certainly one of the prime aims of all governmental pollution control plans.

Enforcement of governmentally imposed auto exhaust emission standards will require the installation of suitable monitoring devices at a multiplicity of inspection stations at least to monitor carbon monoxide and hydrocarbon emissions. Obviously, such devices must be rugged, semiportable, easily operable by nonscientifically skilled personnel, and be capable of giving a complete analysis, at least of carbon monoxide and hydrocarbon content of an automotive exhaust within a short period of time.

Although sophisticated analytical instruments are available today for use by analytical chemists which are capable of carrying out analyses of exhaust gases, there is no accurate inexpensive instrument for use by nonskilled personnel which can fill the need as such an inspection instrument.

It will be obvious that the analytical instrument of this invention can be utilized in applications other than the monitoring of automotive exhaust emissions. For example, the novel devices of this invention can be employed to analyze the efficiency of any burning operation. Since the device of the instant invention is basically an analytical instrument, the usefulness in other areas will likewise be apparent to those skilled in the art.

SUMMARY OF THE INVENTION

It is accordingly an object of this invention to provide a novel method for analyzing gas streams such as automobile exhaust streams.

It is a further object of this invention to provide a novel method for analyzing such streams wherein a selected volume sample is pulsed through the analytical system.

It is another object of this invention to provide a rugged semiportable analytical device for analysis of gaseous combustion products.

It is a further object of this invention to provide such an analytical device for rapidly determining the concentration of various atmosphere pollutants in automobile exhaust emissions.

It is a further object of this invention to provide such a device for quantitative determination of carbon monoxide and hydrocarbons.

It is among the further objects of this invention to provide such an analytical device which can analyze for carbon monoxide, carbon dioxide, hydrocarbons, and specifically provide a reading as to the quantity of olefinic hydrocarbons capable of entering into photochemical reactions to create smog.

It is a further object of this invention to provide an easily operable analytical device without necessity for constant zeroing and without problems of base line drift.

It is a further object of this invention to provide an analytical device in which analysis is acomplished by measuring the effects of a catalytic combustion reaction.

It is a still further object of this invention to provide an analytical device wherein separation of various of the components of the sample is effected by gas chromatographic methods.

It is a further object of this invention to provide an analytical measuring cell to catalytically react with sample components and effectively measure the amount of heat generated by such reaction.

It is a further object of this invention to provide such a measuring cell having a response which is independent of the flow rates of sample and the reaction rate of sample over the catalyst.

It is among the further objects of this invention to provide a novel device for the analysis of a combustion stream such as found in an auto exhaust which can be simply operated and which indicates a pass or fail response.

The above and other objects of the instant invention are achieved by the method of the instant invention which involves passing a selected volume of gas to be analyzed as a pulse through a gas chromatographic separatory column to separate the carbon monoxide and other light components from the hydrocarbon component; passing the carbon monoxide and other components to a catalytic detection cell to produce a spontaneous catalytic reaction selective to carbon monoxide; eluting the hydrocarbon constituent from the gas chromatographic column to a detection cell to produce a spontaneous catalytic reaction of the hydrocarbons; and measuring the heat of reaction in the carbon monoxide and hydrocarbon cells to produce a mass-responsive output functionally related to the quantity of carbon monoxide and hydrocarbons in the sample.

In a specific embodiment, the carbon monoxide component is passed over a hopcalite catalyst (a mixture of copper oxide and magnesium dioxide) at a temperature of about 75° C. at which no interference from accompanying hydrogen or other compounds is experienced. The hydrocarbons are then oxidized over hopcalite catalyst at 350° C. Both catalytic combustions effect a substantially complete reaction of the carbon monoxide and hydrocarbons, thus making the measurement of total heat of reaction an effective mass-related indicator.

Further, according to the instant novel method, a determination of the amount of photochemically active hydrocarbons in addition to making the overall quantitative measurement of hydrocarbons. Unsaturated olefinic or polyolefinic hydrocarbons are predominately responsible for the photochemical smog producing action in the atmosphere. It has been found that these compounds can be selectively oxidized over a hopcalite catalyst at temperatures less than 350° C. without interference from the saturated nonphotochemically active hydrocarbons. Thus by providing two hydrocarbon detection cells, one at about 150° C. to 175° C., and a second at 350° C. a reading of total hydrocarbon content as well as of hydrocarbon "reactivity" can be determined. Herein, the term "reactivity" shall be deemed to refer to the ratio between the quantity of olefinic hydrocarbons to the overall amount of hydrocarbons present, thus providing a measurement of the contribution of the pollutants in the gas sample to the smog forming process.

The method of the instant invention is accomplished using a novel apparatus comprising a gas chromatographic separatory column, a carrier gas stream communicating with the colum, a means to introduce a selected volume sample to said carrier gas stream upstream of said column, detector cells containing a suitable catalyst to initiate a spontaneous reaction with the carbon monoxide and hydrocarbons, respectively, means for selectively directing the carbon monoxide and hydrocarbon components to the respective measuring cells, and a means for generating a signal functionally related to the heat of reaction produced in each of said cells. Specifically, there is also provided herewith a novel calorimetric detector cell having an elongated catalyst chamber surrounded by a thermally sensitive resistance element which is electrically insulated from the catalyst in the chamber which produces rapid response to the heat of reaction produced in the chamber and accordingly can produce a rapid response in the device indicating the quantitative amount of the component being analyzed.

The instant invention also provides methods and apparatus for analyzing carbon dioxide in adition to analyzing carbon monoxide and hydrogen. This may be accomplished prior to passing the sample through the gas chromatographic separatory column by first passing the sample through a detector cell containing an alkali metal hydoxide or a like compound which reacts with carbon dioxide in measuring the heat of reaction in the cell. Of course, this prior carbon dioxide determination is effected in such a manner as to not reduce the amounts of carbon monoxide or hydrocarbon in the sample which are measured at downstream points.

The device of the instant invention provides a rugged semiportable device which can be easily operated with a minimum of controls and which readily gives a "pass" or "fail" response based upon the sample taken directly from an exhaust stream such as an auto exhaust emission stream. Specifically, the novel apparatus of the instant invention utilizes a multiport valve to trap a given volume of sample in a loop and thereafter elutes the sample into a suitable chromatographic column utilizing air as the carrier gas. The hydrocarbon constituent is held up in the column while carbon monoxide and its accompanying constituents pass through the column to the carbon monoxide detector. Then by suitable switching, the hydrocarbons are eluted from the column and are passed to the hydrocarbon detector cell or cells.

Preferably, a parallel reference cell is provided to each detector cell which reference cell receives only carrier gas at the same temperature as the inlet temperature of the sample component being analyzed. Measurement of the amount of carbon monoxide and hydrocarbons can thereafter be easily effected by a measurement device wherein each detector cell and its parallel measuring cells forms two arms of a suitable Wheatstone bridge circuit.

BRIEF DESCRIPTION OF THE DRAWINGS

The instant invention will be more particularly described with reference to those embodiments illustrated in the accompanying drawings.

FIG. 1 illustrates one embodiment of this invention showing an overall detection device in schematic representation, which device is adapted to measure the amount of carbon monoxide, hydrocarbons, carbon dioxide, and the reactivity of an automobile exhaust stream.

FIG. 2 illustrates the multiport valve arrangement which might be employed in a device wherein only analysis of carbon monoxide and hydrocarbons would be desired.

FIG. 3 is a sectional view of a typical calorimetric detection unit which may be employed in the analytical instruments of the instant invention which detecting device has a detector cell and a parallel reference cell.

FIG. 4 is a detail sectional view of a typical detector cell which may be employed as an embodiment in the detection unit illustrated in FIG. 3.

FIG. 5 is an illustration of a typical wheatstone bridge circuit which may be employed to produce mass-responsive integrated output related to the quantity of hydrocarbons or carbon monoxide in the sample being analyzed.

DESCRIPTION OF PREFERRED EMBODIMENTS

The detection operation in the novel units of the instant invention is effected by catalytically reacting the desired component of sample over a catalyst to produce a reaction and monitoring the heat of a reaction thereby generated as a quantative measure of the amount of the component being analyzed. It will be appreciated that a combustion reaction is most effective as a quantitative measurement in this regard since it is easy to carry to completion and since it will produce significant quantities of heat as compared to other reactions which might be used. However, it is pointed out that the principle of the instant invention can utilize any type of reaction in the detector cell. Thus, to detect hydrocarbons, it might be desirable to produce a bromination reaction between the hydrocarbons by passing the hydrocarbons over a suitable bromination catalyst, e.g., ferric bromide.

Most preferably, however, the combustion reactions of carbon monoxide and hydrocarbons can be easily effected over catalysts such as hopcalite, which is essentially a mixture of manganese dioxide and copper oxide. The effectiveness of this catalyst to the oxidation of carbon monoxide has long been known.

In addition, hopcalite catalysts have been found to be extremely effective to produce a quantitative combustion of hydrocarbon vapors at low concentrations and even high flow rates. In particular, in accordance with a particular embodiment of this invention, it has been found that hopcalite will selectively catalyze the oxidation of carbon monoxide at about 75° C. without material interference from the constituents which will accompany carbon monoxide through a gas chromatographic separatory column. The catalyst will also selectively oxidize olefinic hydrocarbons below 200° C. and will quantitatively oxidize all hydrocarbons (except methane) at about 350° C. Accordingly, an effective measurement of carbon monoxide, total hydrocarbon and of hydrocarbon "reactivity" can be obtained in one instrument. It is pointed out, however, that aromatic hydrocarbons normally will not be oxidized at the lower temperature over hopcalite. Since aromatics have also been charged as contributors to the smog forming process, it will be recognized that the determination of reactivity according to this method will provide effectively only an indication of olefinic and diolefinic hydrocarbons and will not give an effective reading of the amount of aromatics contained in the sample.

The very basic requirements for a portable auto exhaust analyzer are that the apparatus having a predictable and repeatable response for each type of measurement and also have a substantial freedom from the effects of gas and sample flow rate changes. It will be appreciated that various automobiles will have different exhaust flow rates and that the rugged semiportability of the device of the instant invention makes it inherent that carrier gas flow rates will vary. The device of the instant invention is substantially independent of modest changes in such variables such as flow rate, reaction to temperature, and catalyst activity, provided that the reaction space velocity is low enough to permit essentially complete oxidation of the sample. However, since the amount of sample introduced into the apparatus may be closely controlled with the device of the instant invention by pulse injection, a highly repeatable introduction of samples of a given size must be established and accordingly, by establishment of this size of sample, the reaction space velocity in the overall instrument can be effectively controlled.

Furthermore, the detector cells of the instant invention have been found to give virtually a linear response with concentration and with sample size. This linearity of response enables the use of an extremely simple wheatstone bridge detection circuit which is both inexpensive and easy to operate.

The detectors of the instant invention show no response or interference from noncombustibles such as nitrogen, nitrogen oxides, oxygen, and carbon dioxide. Water vapor does show an exothermic response in the detector, probably caused by the heat of adsorption. Accordingly, it is preferred as will be discussed, to suitably dry both sample and carrier gas before introducing them to the detection units.

The detection devices of the instance invention have been found to show no appreciable catalyst deactivation even after testing with over three hundred hydrocarbon samples over a several week period.

Automobile exhausts will customarily contain carbon monoxide, carbon dioxide, hydrogen, nitrogen, oxygen, nitrogen oxides, and hydrocarbons. The prime interest in pollution control studies at least at the present time is to obtain readings of total carbon monoxide and total hydrocarbon response. The instant invention also provides in addition to such measurements, in particular embodiments, methods and apparatus for the additional determination of carbon dioxide and hydrocarbon "reactivity."

Accordingly, by the instant invention, the sample to be analyzed is first passed on to a gas chromatographic separatory column through which carbon monoxide, hydrogen, nitrogen, oxygen, and carbon dioxide would pass into a detection unit cell containing hopcalite catalysts at 70° C. At these temperatures, only carbon monoxide produces a response. Hydrogen, carbon dioxide, and nitrogen oxides do not adversely effect this analysis.

The hydrocarbons retained on the gas chromatographic column are then backflushed into a second detection unit where a total hydrocarbon reading is determined by passing the hydrocarbons over hopcalite at a temperature of about 350° C. As pointed out above, to determine reactivity, the hydrocarbon containing components would be passed through two sequential cells, the first of which at about 150° C. to about 200° C. wherein combustion of olefinic and diolefinic hydrocarbons would occur, and then subsequently through a second cell at 350° C. for complete combustion of aromatic and saturated hydrocarbons.

A separate carbon dioxide determination can be made using similar calorimetric detection cells to measure the heat of reaction produced by passing the gas sample over lithium hydroxide or a like hydroxide which would react quantitatively with carbon dioxide but which would not affect the other constituents of the gas sample.

A basic principle involved in the novel method and apparatus of the instant invention is the utilization of the pulse sampling technique. The use of the pulse sampling technique makes the detectors of the instant invention essentially mass-responsive. Therefore, although the "peak height" of the detector response to samples will be dependent upon the carrier gas flow rate, i.e., the rate at which the sample passes through the detector, the area under the peak will be relatively independent of the flow rate through the detector cell. Accordingly, in a rugged semiportable instrument such as the type primarily desired here, the use of an integral or area summing output would be independent of flow variations. On the other hand, in such an apparatus, sample size is easily reproduced by means of a simple two-position sampling valve which would receive the sample at a nominal operating pressure, such as one atmosphere.

Accordingly, the instant invention will provide a device which will give a response functionally related to the total amount of carbon monoxide, hydrogen, carbon dioxide, or the like, present in a particular sample. However, the analysis will not be dependent upon the flow rate of the sample gas stream or the volume of the sample gas stream. As will be apparent, and as will be discussed hereinafter, complete information as to any combustion exhaust stream such as the exhaust emissions from an internal combustion engine can be obtained using the instant invention in combination with a simple flow meter to measure the total volume of the exhaust.

The pulse technique of introduction of sample also produces a transient temperature change in the detector cells which can be measured over a relatively short period of time, i.e., about one or two minutes. This latter advantage of the pulse technique virtually eliminates the problems with base line drift in the instant invention.

With reference to FIG. 1, there is shown a calorimetric analytical device in accordance with the instant invention capable of making complete measurement of carbon monoxide, hydrocarbon, hydrocarbon "reactivity," and carbon dioxide in a gas sample. There is shown exhaust tube 10 which may be the exhaust pipe of an automobile connected into receiving tube 11 equipped with rotometer 12 to measure the total volume of exhaust gases exiting from exhaust tube 10. Correlation of total exhaust volume with the quantitative measurement of amount of carbon monoxide and hydrogen in a given volume sample can give a determination of these pollutants. Immediately downstream from the rotometer, in exit tube 13 of the rotometer, there is disposed sampling probe 12 which functions as a sample intake to the analyzer. If desirable, sampling probe 12 may be equipped with a small intake fan at the outer end thereof to insure complete intake of sample. That portion of the exhaust gases flowing past sampling probe 12 are permitted to vent to the atmosphere.

Line 15 conducts the sample taken in by sampling probe 12 to multiport valve 16 which has 14 ports identified as A through N. Multiport valves such as valve 16 are well known in the art. Essentially, the valve is a two-position valve wherein in one position the flow pattern through the valve is defined by the solid lines between the ports while in the second position, the flow pattern through the valve is defined by the dotted lines through the ports. For purposes of discussion herein, position 1 of the valve shall be regarded as the position wherein the solid line flow path prevails, while position 2 of the valve shall be regarded as the position in which flow is directed by the dotted line path.

Accordingly, it may be seen that in position 1, the flow from sampling probe 12 through line 15 is into port A of valve 16 and out port B to vent.

In this same position, carrier gas simultaneously flows into the system from gas supply 20 which may typically be a tank of compressed air. If desired, an inert gas such as nitrogen could be used as carrier gas; however, the sensitivity of the analyzer of the instant invention to compressed air is negligible and use of compressed air is preferred. Moreover, since in the most preferred embodiment, a combustion or oxidation reaction takes place in the detection cells, air provides the oxygen necessary to support this reaction. The carrier gas supply is passed through drier 21 which may typically be a molecular sieve drier or the like before its introduction to the analyzer. It has been determined that the catalytic measuring cells of the instant invention give a positive or exothermic response to moisture in an injected sample. Accordingly, it is preferable, though not necessary, to use such a drier. As will be seen below, a similar drier is employed to remove moisture from the sample to be analyzed.

A suitable pressure valve 22 is supplied immediately downstream drier 21 to monitor the pressure of gas through the system.

Valve 23 splits the carrier flow sending a portion of carrier gas through line 24 to the reference portions of the carbon monoxide and hydrocarbon measuring cells as will be discussed hereinafter. The remainder of the gas carrier flow passes through line 25 which directs a portion of carrier gas to line 26 and thereafter through the reference portion of the carbon dioxide measuring cell, as also will be discussed hereinafter. The remaining portion of carrier gas is directed through line 28 and flow restrictor 27 to port J of 14 port valve 16 and through line 30 and flow restrictor 29 to port M of valve 16.

Lines 31 and 32, from line 24, provide constant bleed streams of air through the detection cells in detection units 50, 60, and 70 to assure there is sufficient oxygen over the catalyst at all times will complete combustion of the sample passing therethrough. Flow restrictors enable control of the air bleed streams to the detectors.

The balance and flow through the device of the instant invention may be suitably adjusted by manipulation of flow restrictors 27 and 29. However, as pointed out above, the detectors of the instant invention are not affected by changes in flow rates, and accordingly, there is no necessity for extreme accuracy in such flow balancing.

Chromatographic column 35 is connected to valve 16 at ports K and H. The packing material employed in the chromatographic column will vary depending upon the precise gaseous components desired to be measured. Typical column components for measuring combustion product samples to separate hydrocarbons from carbon monoxide and the accompanying components, would be silica gel coated with a polyalkylene glycol or the like which is well known in the art.

Detection unit 40 is the carbon dioxide detection unit and comprises measuring cell 41 and reference cell 42 accommodated within a suitable metallic heat sink 43. The structure of the detection units will be more explicitly discussed below. The inlet side of measuring cell 41 is connected to port D of valve 16 by line 39. The outlet side of measuring cell 41 proceeds through line 44 and drier 45 to port G of valve 16. The inlet side of reference cell 42 of detection unit 40 receives carrier gas only through line 26 and vents the carrier through line 49 to the atmosphere.

Each detection unit is provided with a temperature controller such as proportioned temperature controller 46 on calorimetric detection unit 40. In addition, each detection unit is provided with a detector control system 47 which may typically be a wheatstone bridge circuit. Meter 48 gives a measurement of the amount of carbon dioxide sensed in detection unit 40.

The carbon dioxide detection unit 40 contains lithium hydroxide catalyst in each of the detector cell 41 and reference cell 42. Carbon dioxide in the sample upon contact with the lithium hydroxide forms the carbonate in an exothermic reaction. Measurement of this heat of reaction is made by the cell as a measurement of carbon dioxide content. This reaction consumes the lithium hydroxide which must be periodically replaced with a fresh catalyst. The reaction in detection unit 40 does not affect the carbon monoxide or hydrocarbon components of the sample. Thus it will be appreciated that calorimetric detection unit 40 may utilize any reactant which will selectively enter into an exothermic or even an endothermic reaction with carbon dioxide. In the latter case, if an endothermic reaction took place the reactants within the cell would absorb heat which would produce an imbalance in an appropriate detector circuit.

If lithium hydroxide is employed, calorimetric detection unit 40 is appropriately maintained at a temperature slightly above room temperature in order to enable accurate temperature control. A temperature of about 35° C. in the carbon dioxide detection unit would hence be preferred.

Calorimetric detection unit 50 is the carbon monoxide detection unit and is similar in construction to carbon dioxide detection unit 40. However, in detection unit 50, measuring cell 51 and reference cell 52 contain a catalyst which is capable of initiating and sustaining a reaction of carbon monoxide. For example, a hopcalite metal oxide catalyst which promotes a spontaneous catalytic combustion reaction in the presence of oxygen within the cell may be employed as discussed above. Heat sink member 53 keeps both the measuring and reference portions of the cell at essentially the same temperature.

Hopcalite is a preferred catalyst since it effects a substantially complete oxidation of carbon monoxide and since it will not require frequent replacement. The carbon monoxide detection unit is operated at a temperature of from about 50° C. to about 100° C. since at temperatures in this range carbon monoxide combustion is effected without an appreciable exothermic response from hydrogen accompanying the carbon monoxide component. However, prior to the analysis of the carbon monoxide, the hydrocarbon constituent must be separated from the carbon monoxide since some hydrocarbons cause interference to this carbon monoxide determination.

The inlet side of measuring cell 51 is connected to port F of valve 16 through line 38. Line 54 vents the outlet from measuring cell 51 to the atmosphere or the like. Similarly, line 37 to the inlet side of measuring cell 52 provides carrier gas to the measuring portion of detection unit 50 which carrier gas is vented downstream of the detection unit through line 59. Bleed line 31 furnishes a bleed stream of air or oxygen to cell 50 to sustain the carbon monoxide oxidation.

Temperature controller 56, detection controller 57, and meter 58 operate in essentially the same manner as do their counterparts associated with detection unit 40, as will be more fully explained below.

Detection units 60 and 70 form the hydrocarbon analyzing train. Specifically, detection unit 60 produces a response functionally related to the amount of olefinic or photochemically sensitive ingredients of the sample. Detection unit 70 completes the analysis by analyzing for saturated hydrocarbons and aromatic hydrocarbons.

Again, the construction of detection units 60 and 70 is similar to that of the carbon monoxide detection unit. Hopcalite is again preferred as the catalyst in these detection units since virtually all hydrocarbons except for methane can be quantitatively oxidized over hopcalite at about 350° C. Moreover, hopcalite will selectively cause combustion of olefinic, diolefinic, and acetylenic hydrocarbons such as ethylene, acetylene and the like at temperatures below 200° C. without producing a significant response from the saturated hydrocarbons such as ethane or butane. Thus by using hopcalite, a single hydrocarbon determination of total hydrocarbon content (except methane) may be made by maintaining a single calorimetric detection unit at about 350° C. Alternatively, a reading of hydrocarbon "reactivity" may be obtained in addition to total hydrocarbon by providing a hydrocarbon analysis train with a first colorimetric detector cell at about 150° C. to about 200° C., with the remainder of the hydrocarbon determination being provided by a second cell at about 350° C.

The inlet end of measuring cell 61 of detection unit 60 is connected to port I of valve 16 by line 36. Following the analysis for unsaturated hydrocarbons, the effluent from measuring cell 61 in detection unit 60 travels through line 64 to measuring cell 71 of detection unit 70. Likewise, carrier gas passes into measuring cell 62 of detection unit 60 and through line 69 into measuring cell 72 of detection unit 70 and thence to vent.

The temperature controllers and detection control units operate in a manner similar to their counterparts in detection units 40 and 50.

Operation of the device illustrated in FIG. 1 is as follows. When the valve 16 is in position 2 (the position in which the dotted line path prevails), the sample taken in at sampling probe 12 flows into port A of valve 16 and thence to port N out of the valve via ports C and B to vent. Thus, in position 2 the sample loop 80 is being filled with a predetermined volume of sample to be analyzed.

Simultaneously, with the valve in position 2, carrier gas flows through line 30 to port M of valve 16, thence via port L and connecting tube 81 to port E of the valve. This carrier gas flow leaves the valve at port D and proceeds through line 39 to flush measuring cell 41 of detection unit 40 and thereafter continues through line 44, drier 45, into port G of the valve, and out port F through line 38 to flush measuring cell 51 of detection unit 50.

A second carrier gas stream at the same time enters valve 16 through line 28 at port J, proceeds through port K to flush or elute chromatographic column 35 in the direction shown by the dotted arrow. This carrier gas flows reenters the valve at port H, and exits at port I. This stream is carried by line 36 to measuring cell 61 of detection units 60 and measuring cell 71 of detection unit 70 to flush the hydrocarbon detection train.

To initiate an analysis of the sample loaded into sample loop 80 while the valve is in position 2, the valve is returned to position 1 (the position wherein the solid flow path prevails). In this position, the exhaust stream is simply routed into port A of valve 16 and exits immediately from port B to vent. Simultaneously, the sample trapped in sample loop 80 is pushed as a slug or pulse of sample through the apparatus by a carrier gas stream entering the valve at port M through line 30 and thence forcing the sample via ports C and D through measuring cell 41 of carbon dioxide analyzer 40. The carbon dioxide analysis is completed as the sample passes through detection cell 41 and thereafter the sample and carrier gas travel through line 44 and drier 45 to chromatographic column 35 via ports G and H of valve 16. The flow of the carrier gas-propelled sample through chromatographic column 5 is in the direction of the solid arrow when the valve is in position 1. Chromatographic separatory column 35 retains and holds the hydrocarbon components of the gas sample while the carbon monoxide component of the gas sample (including nitrogen, nitrogen oxides, oxygen, hydrogen, and the like) continues through the column returning to valve 16 through port K. The stream proceeds via port L and connector 81 and exit valve 16 through port F and line 38. Thus the carbon monoxide component of the gas sample is routed to measuring cell 51 of detection unit 50 wherein a carbon monoxide determination is made.

It may be seen that when the valve is returned to position 2, carrier gas will elute the hydrocarbons adsorbed in gas chromatographic column 35 in the direction shown by the dotted arrow and will then perform the hydrocarbon analysis as described above by pushing the eluted hydrocarbons through the hydrocarbon analysis train.

To effect an analysis, sampling probe 12 would be placed in an automobile exhaust pipe, the sample valve would be turned from position 1 to position 2, for a short period of time to fill sample loop 80 and to flush measuring cell 41, measuring cell 51, and measuring cells 61 and 71. The valve is then returned to position 1 at which point the sample is eluted from sample loop 80 and carbon dioxide and carbon monoxide measurements are obtained in detection units 40 and 50, respectively. During this period, the hydrocarbon component of the sample is adsorbed in chromatographic column 35. Valve 16 is then returned to position 2 whereby the flow of carrier gas through line 28 elutes the hydrocarbons in the column through hydrocarbon detection units 60 and 70.

It can be appreciated that for the next sample, the only necessity will be to place sample probe 12 in the next sample environment, i.e., the exhaust pipe, for a sufficient period of time to insure that all previous sample has been flushed from loop 80 and to assure that the carrier gas has had a sufficient period of time to flush all detection units and the chromatographic column.

Referring now to FIG. 2, there is shown a typical multiport valve arrangement utilizing a ten-port valve which can be employed in a device of the instant invention in the event that only a carbon monoxide and hydrocarbon determination is desired. The operation of the valve is similar to valve 16 in FIG. 1 save that the elimination of detecting unit 40 for carbon dioxide eliminates the need for four ports. The inlet port, for sample from the exhaust tube, is line 115 that is connected to a suitable sampling probe such as probe 12 in FIG. 1. The remaining input and exit lines from the valve are appropriately marked as to their function. Once again, sample loop 180 is loaded with the valve in position 2, the valve is switched to position 1 for a carbon monoxide determination, and is returned to position 2 to backflush column 135 and make the hydrocarbon determination.

Having now considered the various flow patterns which may be employed in the illustrated embodiments of this invention to achieve an analysis of carbon dioxide, carbon monoxide, and hydrocarbons, reference is made to FIG. 3, which shows in one embodiment a suitable detector cell which may be employed as the detection unit for any one of these components. FIG. 3 is a cross-sectional view of a typical detection unit such as unit 50 of FIG. 1. Measuring cell 51 on the left-hand side of detection unit 50 receives the gas sample after it has passed through the chromatographic column and has had the hydrocarbons removed. Accordingly, the carbon monoxide analysis takes place in measuring cell 51. Reference cell 52 receives a flow of carrier gas and accordingly cancels out any effect which the carrier gas may have upon the analysis. Both the measuring cell 51 and the reference cell 52 are set in a metal block 53 which serves as a heat sink for the detection unit to keep both measuring cells at essentially the same temperature.

Gas inlet lines 37 and 38 to the reference cell and measuring cell, respectively, are wrapped around the upper portion of heat sink 53 in order to preheat the gas to substantially the cell temperatures prior to introducing the gas to the cells. A cartridge heater 90 mounted in the top of heat sink 53 is attached to a proportional temperature controller 95. The controller also is capable of detecting the temperature of the detection unit by means of resistance thermometer 91 in the lower portion of the heat sink. Accordingly, the desired temperature of each detection unit may be maintained at the proper level. Proportional temperature controllers such as employed here are well known in the art.

Each cell in detection unit 50 comprises a catalyst containing cartridge 100 surrounded by a suitable thermally sensitive resistance element such as coil 101. The arrangement of catalyst cartridge within heat sink 53 may be more clearly seen with reference to FIG. 4.

In FIG. 4, there is shown cartridge 100 which is a replaceable catalyst-containing cylindrical member having perforated end portions 102 and 103 at the top and bottom thereof to permit lengthwise flow of gas therethrough. The catalyst is contained in region 105 of the cartridge which is also bounded by screens 106 and 107. In the upper and lower portions of the cartridge i.e., between screens 102 and 106 and between screens 107 and 103, a suitable filter material 104 such as glass wool or the like is provided to trap any particulate material which might exist in the sample or in the carrier gas stream. Accordingly, entire cartridge 100 is so disposed that it may be entirely removed from detection unit 50 by appropriate unfastening of bolts 98 and 99 to remove the top portion of the heat sink 53' from the bottom portion 53.

Cartridge 100 is elongated in shape preferably having a length-to-diameter ratio of at least 4-to-1. It will be appreciated that in the preferred detection cells of this invention, measurement is made of the heat of reaction of the sample as it passes over catalyst which promotes a spontaneous reaction of the component being analyzed. Accordingly, heat escape to the walls and to the resistance element 101 must be rapid and virtually complete for accurate analysis. By providing a large length-to-diameter ratio and by providing a sensing element over essentially the entire length of the cartridge, the heat escape from the catalyst region in the cartridge will escape readily to resistance element 101 through the walls of the cartridge.

Walls 108 of cartridge 100 must accordingly be heat-conductive in nature. However, inasmuch as the catalysts which may be employed in the detection units of this invention may be at least partially electrically conductive, the walls 108 must also serve as electrical insulators. It is extremely important in selection of the material for the cartridge walls that a good heat conductor-electrical insulator be chosen. Boron nitride has been found to be satisfactory for this purpose. However, highly preferred are cartridges formed from anodized aluminum since such cartridges may be drawn with extremely thin walls, to form elongated catalyst-containing chambers having length-over-diameter ratios well exceeding 4-to-1.

It will be noted that resistance element 101 extends substantially beyond the catalyst-containing zone 105 of the cartridge. Accordingly, any residual heat from the reaction taking place over catalyst 105 will be sensed as the reaction products pass out of the catalyst zone prior to exiting the cartridge entirely, i.e. between screens 107 and 103.

It also will be noted that resistance element 101 is thermally insulated from heat sink 53 by means of insulation 111. Accordingly, changes in temperature in the heat sink, even of several degrees as effected by the proportional controller 101 are accomplished slowly thus assuring that both cells remain at essentially the same temperature throughout the detection operation.

Resistance coils 101 of each cell are suitable resistor wires which produce changes in resistance with temperature. Typically platinum wires can be employed.

All the detection units may employ a construction as in FIGS. 3 and 4. Of course, the catalysts in the cartridge will vary as between the carbon dioxide unit 40 and the other units as explained above.

Both resistance coils 101 from measuring cells 51 and reference cell 52 are electrically connected to the detection system 57 by means of wires 115 through 118. With reference now to FIG. 5, it will be seen that coils 101 of measuring cell 52 and detection cell 51 form arms of the Wheatstone bridge circuit. Power supply 120 across the Wheatstone bridge circuit may be an AC or DC power supply as preferred. Fixed resistors 121 and 122 complete the wheatstone bridge circuit with a suitable balancing resistor 123, such as a ten-turn pot enabling accurate balancing of the circuit. The potential across the Wheatstone bridge is attenuated through the desired resistance at 125 to produce a full scale reading on a recorder or a meter at a desired output level.

When a resistance unbalance in the bridge occurs a potential results across the bridge and this output is then passed through differential amplifier 126 and coupling capacitor 127, the latter to prevent any AC drift in the remaining portion of the circuit. Operational amplifier 128 then feeds a signal to integrating circuit 129 equipped with a suitable reset 130. The output from integrating circuit is essentially a mass-responsive signal and is not peak height responsive. Thus, regardless of the rate at which the catalytic reaction takes place over the catalyst, the meter response at 58 will be related to the total mass of the component being analyzed which pass through the detector cell. Preferably, integrator circuit 129 maintains its output until reset 130 is activated at which time it will return to zero. Accordingly, after a test is made, for example on an automobile, the meter will show a mass-related reading and will maintain that reading until the reset is activated.

In accordance with the instant invention, there is provided a method for rapidly analyzing the products of a combustion reaction such as carbon monoxide, carbon dioxide, and hydrocarbons. It is pointed out that the prime concern in automobile pollution is currently carbon monoxide and hydrocarbon pollution; and accordingly, it will be appreciated that the devices of the instant invention may selectively produce only analyses of carbon monoxide and hydrocarbon, as for example if the arrangement as illustrated in FIG. 2 is used.

It also will be appreciated that the novel analyses technique and apparatus of this invention can be utilized to make any calorimetric analyses. It will be obvious to those skilled in the art that the novel detection units of this invention and the pulse calorimetric device disclosed can be widely employed to effect rapid, accurate analyses with an inexpensive rugged instrument.

What is claimed is:

1. An apparatus for analyzing a gas stream containing products of a combustion reaction including carbon monoxide and hydrocarbons which comprises:
 (a) a gas chromatographic separatory column;
 (b) means for conducting a carrier gas stream into said column;
 (c) means to introduce a selected volume sample into said carrier gas stream upstream of said column;

(d) first and second detector units in downstream fluid communication with said column and containing catalysts to initiate spontaneous reactions with carbon monoxide and hydrocarbons, respectively;

(e) means to direct carbon monoxide eluting from said column to said first detector unit and to direct hydrocarbons eluting from said column to said second detector unit;

(f) means for detecting the heat of reaction in each of said detector units; and (g) means for generating an electrical signal functionally related to the total heat of reaction in each of said units.

2. The apparatus of claim 1 wherein said spontaneous reactions in said first and second detection units are combustion reactions of said carbon monoxide and of said hydrocarbons initiated by said catalysts.

3. The apparatus of claim 2 wherein said catalyst in said first and second detector units is a mixture of copper oxide and magnesium dioxide which is maintained at about 50° C. to 100° C. in said first detector unit, and which is maintained at least at 350° C. in said second detector unit.

4. The apparatus of claim 3 including drying means upstream of said detector units for removal of moisture from said carrier gas and said sample.

5. The apparatus of claim 1 wherein said second detector unit for hydrocarbons comprises a first detection portion containing a catalyst under conditions to initiate selective spontaneous reactions with ethylenically and acetylenically unsaturated hydrocarbons, and a second detection portion containing catalysts to initiate spontaneous reactions with saturated hydrocarbons.

6. The apparaus of claim 5 wherein said first and second detection portions of said second detector unit contain a mixture of copper oxide and magnesium dioxide which is maintained at about 150° to 200° C. in said first detection portion, and which is maintained at least at 350° C. in said second detection portion.

7. The apparatus of claim 1 including a carbon dioxide detection unit upstream of said column containing a compound which selectively reacts with carbon dioxide to form a carbonate, means to detect the heat of said reaction, and means to generate a signal functionally related to said heat of reaction.

8. The apparatus of claim 1 wherein each detection unit comprises a detecting portion to receive the constituents of sample eluting from said column, and a parallel reference portion maintained under conditions identical to each detection portion which receives carrier gas alone, and means to detect any heat generated in said reference portions by said carrier gas.

9. An apparatus for analyzing exhaust emissions of an internal combustion engine for carbon monoxide and hydrocarbon content which comprises:

(a) a gas chromatographic separatory column;

(b) means for conducting a carrier gas stream into said column;

(c) flow directing valve means having positions which establish oppositely directed flows of carrier gas through said column and having a sample loop in fluid communication with said column in at least one of said positions for trapping a selected volume of sample;

(d) a first detector unit downstream from said column when said valve is in a first position containing a catalyst to initiate a spontaneous oxidation with carbon monoxide;

(e) a second detector unit downstream from said column when said valve is in a second position containing a catalyst to initiate a spontaneous reaction with hydrocarbons;

(f) means for detecting the heat of reaction in each of said detector units; and (g) means for generating an electrical signal functionally related to the total amount of heat of reaction in each of said units.

10. The apparatus of claim 9 wherein a carrier gas stream is directed through said second detector unit when said valve is in said first position for purposes of flushing said detector units.

11. The apparatus of claim 9 wherein said first and second detector units contain a mixture of copper oxide and magnesium dioxide maintained at about 50° to 100° C. in said first detector unit, and maintained at least at about 350° C. in said second detector unit.

12. The apparatus of claim 11 wherein said second detector unit comprises a first detection cell maintained at a temperature of from about 150° to about 250° C. to oxidize ethylenically and acetylenically unsaturated hydrocarbons, and a second detector cell at least at 350° C. to oxidize saturated hydrocarbons.

13. Apparatus for analyzing a gas stream for overall hydrocarbon content and content of ethylenically and acetylenically unsaturated hydrocarbons which comprises:

(a) means to separate the hydrocarbons from other constituents of said gas stream;

(b) a low temperature detector cell containing a mixture of copper oxide and magnesium dioxide at a temperature of about 150° to about 200° C. for initiating catalytic combustion with ethylenically and acetylenically unsaturated hydrocarbons;

(c) a high temperature detector cell containing copper oxide and magnesium dioxide at a temperature of at least 350° C. to initiate a catalytic combustion reaction with saturated hydrocarbons;

(d) means for conducting the hydrocarbons separated from said gas stream to said low temperature detector cell and said high temperature detector cell;

(e) means for detecting the heat of combustion in each said first and said second detector cells; and (f) means for generating a signal functionally related to the heat of reaction in said cells.

14. The apparatus of claim 13 wherein said means to separate hydrocarbons from other constituents of said gas stream is a gas chromatographic separatory column.

15. The apparatus of claim 14 including means for conducting a carrier gas stream into said gas chromatographic separatory column, and means to introduce a selected volume of said gas stream to be analyzed into said carrier gas stream upstream of said column.

16. A calorimetric analytical detector device for measuring the heat of reaction of at least one component of a fluid sample passing therethrough comprising:

(a) an elongated chamber containing a compound suitable for producing a spontaneous reaction with at least one component of said fluid sample, said chamber having a length-to-diameter ratio of at least 4-to-1;

(b) means to introduce said sample at one end of said chamber;

(c) means to elute the reaction products of said spontaneous reaction of the opposite end of said chamber; and (d) thermally sensitive resistance means surrounding the length of said chamber and electrically insulated from said compound.

17. The detector device of claim 16 wherein the walls of said chamber between said compound and said thermally sensitive resistance means are boron nitride.

18. The detector device of claim 16 wherein the walls of said chamber between said compound and said thermally sensitive resistance means are anodized aluminum.

19. The detector device of claim 16 wherein said compound in said elongated chamber is a mixture of copper oxide and magnesium dioxide.

20. The detector device of claim 16 wherein said compound within said elongated chamber is lithium hydroxide.

21. The detector device of claim 16 including means to maintain said compound within said elongated chamber at an elevated temperature.

22. The detector device of claim 16 wherein said compound is contained within the midportion of said elongated chamber and said thermally sensitive resistance means extends beyond the region of said compound to detect heat in the effluent from the midportion of said chamber.

23. The detector device claim 16 including an elongated cartridge removably fitted in said elongated chamber, said cartridge containing said compound suitable for producing a spontaneous reaction.

24. The detector device of claim 23 wherein the walls of said cartridge are composed of a thermally conductive electrically insulative material selected from the group consisting of anodized aluminum and boron nitride.

25. A method for analyzing products of a combustion reaction for carbon monoxide and hydrocarbon content which comprises:
   (a) trapping a selected volume of said products;
   (b) propelling said selected volume through a gas chromatographic separatory column by means of a carrier gas to separate carbon monoxide from the hydrocarbons contained in said selected volume;
   (c) catalytically oxidizing the carbon monoxide exiting said column in a first detector cell;
   (d) eluting said hydrocarbons from said gas chromatograph separatory column;
   (e) catalytically reacting said hydrocarbons in a second detector cell; and
   (f) measuring the heat produced by said oxidation and said reaction to measure the amount of carbon monoxide and the amount of hydrocarbon in said selected volume sample.

26. The method of claim 25 wherein said catalytic reaction of said hydrocarbons is a combustion reaction.

27. The method of claim 25 including the additional step of analysis for carbon dioxide which comprises passing said selected volume over a compound which selectively reacts with carbon dioxide to form a carbonate and measuring the heat produced by said reaction to measure the amount of carbon dioxide in said selected volume sample.

28. The method of claim 25 wherein said catalytic oxidation of carbon monoxide and said catalytic reaction of hydrocarbons is effected over a catalyst of copper oxide and magnesium dioxide.

29. The method of claim 28 including the step of removing moisture from said sample and said carrier gas before said catalytic oxidation and said catalytic reaction.

30. A method for analyzing exhaust emissions of an internal combustion engine which comprises:
   (a) trapping a selected volume of said emissions;
   (b) propelling said selected volume through a gas chromatographic separatory column by means of a carrier gas to separate the hydrocarbons in said emissions from carbon monoxide;
   (c) conducting the carbon monoxide exiting said column over a catalyst of copper oxide and magnesium dioxide at about 50° to about 100° C. to oxidize said carbon monoxide;
   (d) eluting said hydrocarbons from said gas chromatographic separatory column;
   (e) conducting said hydrocarbons eluting from said column over a catalyst of copper oxide and magnesium dioxide at a temperature of at least about 350° C. to oxidize said hydrocarbons; and
   (f) measuring the heat produced by each of said oxidations to measure the amount of carbon monoxide and the amount of hydrocarbons at selected volume samples.

31. The method of claim 30 including the additional step of: conducting said hydrocarbons eluting from said column over copper oxide and magnesium dioxide at a temperature in the range of 150° to about 200° C. to oxidize the ethyenically and acetylenically unsaturated hydrocarbons, prior to the oxidation at 350° C.; and measuring the heat produced by said oxidation at 150° to about 200°.

32. The method of claim 30 including the step of reacting said selected volume sample with lithium hydroxide upstream of said gas chromatographic separatory column and measuring the heat produced by said reaction as a measure of content of carbon dioxide.

33. The method of claim 32 including the step of drying said selected volume of said emissions and said carrier gas upstream of said gas chromatographic separatory column.

34. A method for analyzing a hydrocarbon stream for total hydrocarbon content and content of ethylenically and acetylenically unsaturated hydrocarbons which comprises:
   (a) conducting a preselected volume sample of said stream over a catalyst of copper oxide and magnesium dioxide at a temperature of 150° to 200° C. to oxidize the ethylenically and acetylenically unsaturated hydrocarbons;
   (b) conducting the effluent from said first oxidation over a catalyst of copper oxide and magnesium dioxide at a temperature of at least 350° C.; and
   (c) measuring the heat produced by each of said oxidations.

References Cited

Hogan et al.: Chem. Abstr. 52, 15133h (1958).
Nelsen et al.: Anal. Chem. 33, #9, August 1961, 1150–1151.
Walker et al.: Hydrocarbon Processing, October 1965, vol. 44, No. 10, pp. 171–172.

MORRIS O. WOLK, Primary Examiner

R. M. REESE, Assistant Examiner

U.S. Cl. X.R.
23—254